United States Patent [19]

Foley et al.

[11] 3,934,068

[45] Jan. 20, 1976

[54] GLASS FIBER REINFORCEMENT

[75] Inventors: Kevin M. Foley, Hebron; Francesco M. Vigo, Heath; Frank Paul McCombs, Granville, all of Ohio

[73] Assignee: Owens-Corning Fiberglas Corporation, Toledo, Ohio

[22] Filed: July 24, 1974

[21] Appl. No.: 491,442

[52] U.S. Cl. ............... 428/292; 428/378; 428/391
[51] Int. Cl.² .. B32B 9/00; B32B 25/20; D02G 3/00
[58] Field of Search. 117/126 GE, 126 GB, 126 GS, 117/72; 161/170, 175, 176; 428/391, 378, 292, 295; 260/448.8 R, 28.5 B, 28 RR, 29.2 M, 29.2 EP, 46.5 R; 106/287 SB

[56] References Cited
UNITED STATES PATENTS

| | | | |
|---|---|---|---|
| 2,650,934 | 9/1953 | Rust et al. | 260/448.8 R |
| 2,799,598 | 7/1957 | Biefeld et al. | 260/29.2 M |
| 2,946,701 | 7/1960 | Plueddemann | 117/126 GS |
| 3,169,884 | 2/1965 | Marzocchi et al. | 117/126 GS |
| 3,424,608 | 1/1969 | Marzocchi et al. | 117/77 |
| 3,567,671 | 3/1971 | Janetos et al. | 260/28.5 R |
| 3,827,230 | 8/1974 | Marzocchi et al. | 117/126 GE |

*Primary Examiner*—Lorraine T. Kendell
*Attorney, Agent, or Firm*—Carl J. Staelin; John W. Overman; Keith V. Rockey

[57] ABSTRACT

A composition for use in the treatment of glass fibers for use as reinforcement for plastics and elastomeric materials and glass fibers treated therewith in which the composition is formulated to include the reaction product of a silicon halide such as silicon tetrachloride with an aliphatic epoxide containing at least fourteen carbon atoms.

16 Claims, No Drawings

GLASS FIBER REINFORCEMENT

This invention relates to the reinforcement of plastic resins and elastomeric materials, and more particularly, to coating compositions for the use in the treatment of glass fibers to improve the bonding relationship between the glass fibers and resinous or elastomeric materials.

The term "glass fibers", as used herein, is intended to refer to and include (1) continuous fibers formed by the rapid attenuation of hundreds of streams of molten glass and to strands formed when such continuous glass fiber filaments are gathered together in forming; and to yarns and cords formed by plying and/or twisting a number of strands together, and to woven and non-woven fabrics which are formed of such glass fiber strands, yarns or cords, and (2) discontinuous fibers formed by high pressure steam or air or other attenuating force directed angularly downwardly onto multiple streams of molten glass issuing from a glass melting bushing and to yarns that are formed when such discontinuous fibers are allowed to rain down gravitationally onto a foraminous surface wherein the fibers are gathered together to form a sliver which is drafted into a yarn; and to woven and non-woven fabrics formed of such yarns or discontinuous fibers, and (3) combinations of such continuous and discontinuous fibers in strands, yarns, cords and fabrics formed thereof.

As used herein, the term "elastomer" is intended to mean and include natural rubber in the cured or uncured stage, vulcanized or unvulcanized stage, and synthetic organic elastomeric materials such as nitriles, acrylics and esters and particularly copolymers of butadiene with these and terpolymers thereof with styrene and synthetic rubbers as represented by butadiene polymers and copolymers with monoolefins such as butadiene-styrene copolymer, butadiene-acrylonitrile copolymers, butadiene-styrene vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha-monoolefin having from 3–20 carbon atoms, such as propylene, and a polyene, such as dicyclopentadiene, 1,4-hexadiene and preferably an alkylene or alkylidene norborene, such as 5-alkylidene-2-norbornene and the like in which the alkylidene group numbers from 2–12 carbon atoms, and polysulfone rubbers.

As used herein, the term "resin" is intended to mean and refer to thermoplastic and/or thermosetting resins including epoxy resins, polyester resins, polyamide resins, phenolic-aldehyde resins, melamine-aldehyde resins, urea-aldehyde resins, polystyrene resins, etc.

It is now well known to combine glass fibers with resinous plastics and elastomeric materials in the manufacture of glass fiber-reinforced resinous products and glass fiber-reinforced elastomeric products. One of the problems which has been encountered in the combinations of glass fibers with resinous plastics and elastomeric materials is the problem of securely bonding or anchoring the glass fiber surfaces to the organophilic resin or elastomer in which the glass fibers are distributed. It is believed that this problem stems in part from the fact that glass fibers are completely smooth, rod-like members and in part from the fact that the glass fiber surfaces are highly hydrophilic in nature, thereby resulting in the formation of a thin but tenacious film of moisture on the glass fiber surface which serve to destroy any bond, chemical or physical, which would otherwise be formed between the glass fiber surfaces and the elastomeric material or resinous material with which the glass fibers are combined.

There are different problems encountered in the reinforcement of resinous materials as compared to the reinforcement of elastomeric materials. Glass fiber reinforced resins are generally quite rigid, and thus any bonding relationship which is established between the glass fiber surfaces and the resin constituting a continuous phase in which the glass fibers are distributed, can be a static bond, whereas the bond between glass fiber surfaces and elastomeric materials should of necessity be in the nature of a dynamic bond since glass fiber reinforced elastomeric products are generally subjected in use, to flexure as a load is applied.

To minimize the problems of bonding glass fiber surfaces to resinous materials, it has been the practice in the manufacture of glass fiber reinforced resins to make use of glass fibers in the form of strands, cords, woven and non-woven fabrics, hereinafter referred to as bundles in which the individual glass fiber filaments have been coated, preferably during forming, with a size composition formulated to include an organosilicon compound as an anchoring agent. The size composition serves not only to impart lubricity to the individual glass fiber filaments to avoid destruction through mutual abrasion but also to aid in establishing a secure chemical bond between the glass fiber surfaces and the resin constituting the continuous phase.

On the other hand, it has been the practice in the treatment of glass fibers for use as reinforcement for elastomeric materials to first size the glass fibers with a size composition containing an anchoring agent of the type described above, and then forming the glass fibers into bundles which are then impregnated with an impregnating composition formulated to include a blend of resorcinol-aldehyde resin and at least one elastomer. The impregnant serves not only to coat the original glass fibers forming the bundle but also to separate the individual glass fibers each from the other and define a unitary bundle structure. The impregnant in the bundle thus serves to cushion the fibers and intertie the glass fiber system with the elastomer material of the continuous phase.

While the practice as described above has provided significant improvements in the establishment of a secure bonding relationship between elastomeric materials and glass fibers and between resinous plastics and glass fibers, there is still room for further improvement, particularly in terms of the economics of the use of organosilicon compound anchoring agents. Such compounds are quite expensive, and therefore must be employed somewhat sparingly in the treatment of glass fibers.

It is accordingly an object of the present invention to provide a composition for use in the treatment of glass fibers as reinforcement for resinous plastics and elastomeric materials which overcomes the foregoing disadvantages.

It is a further object of the present invention to provide a composition for use in the treatment of glass fibers for reinforcement for resinous plastics and elastomeric materials in which the composition is formulated with an organosilicon compound which is significantly less expensive to employ and which can be used in greater amounts to establish a secure bonding relationship between glass fibers and resinous plastics or elastomeric materials.

It is a related object of the present invention to provide glass fibers treated with a composition embodying the concepts of the present invention for use as reinforcement for resinous plastics and elastomeric material.

The concepts of the present invention reside in a composition for use in the treatment of glass fibers in which the essential component is the reaction product of a silicon halide and at least one epoxide containing 10 to 25 carbon atoms and about 1 epoxide group per mole. It has been found that the epoxide group of the aliphatic epoxide employed reacts with the halogen atoms of the silicon halide to form beta-haloalkoxy groups

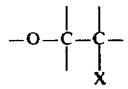

wherein X is a halogen atom, and the beta-haloalkoxy groups thus formed impart stability to the reaction product to render such reaction product more resistant to hydrolysis in aqueous media, and particularly aqueous alkaline media having a pH greater than 7.5. The reaction products employed in the practice of this invention can therefore be formulated with alkaline latices formulated to include a resorcinol-aldehyde resin and at least one rubber or elastomer for application directly to glass fibers as they are formed. The resulting coated glass fibers can thus be directly combined with elastomeric materials in the manufacture of glass fiber reinforced elastomeric products without the need to employ a separate impregnation step as described by the prior art. The beta-haloalkoxy group characteristic of the reaction products employed in the practice of this invention do not, unlike conventional organosilicon compounds, have a tendency to cause the elastomeric component of such treating compositions to precipitate from the latex.

Without limiting the present invention as to theory, it has also been found that the long carbon chains, which are believed to become attached to the silicon atom, serve to securely intertie the elastomeric material, either in the continuous phase or in the treating composition, to the glass fiber surfaces. In addition, the carbon chains serve to impart improved lubricity to the glass fiber surface without destroying their fiberous characteristics.

In accordance with the practice of the present invention, a silicon halide is reacted with an aliphatic epoxide. Silicon halides which can be used in the practice of the present invention include compounds having the formula $$(R)_n Si X_{4-n}$$

wherein R is an organic group and preferably an organic group containing ethylenic unsaturation (eg., an alkenyl group containing 2 to 5 carbon atoms such as a vinyl group or an allyl group), n is 0 or 1 and X is halogen, and preferably chlorine or bromine. Preferred silicon halides are silicon tetrachloride and silicon tetrabromide; use can also be made of vinyltrichlorosilane, allyltrichlorosilane, etc.

The epoxides employed in the practice of the present invention are preferably aliphatic hydrocarbons, which contain 10 to 25 carbon atoms and about 1 epoxide group per mole. Use can be made of epoxides containing non-terminal epoxide groups although it is generally preferred to employ epoxides in which the epoxy group is located in part on a terminal carbon atom.

One epoxide which has been found to be highly suitable for use in the preparation of an organosilicon compound in accordance with the concept of the present invention is a material sold by Proctor & Gamble under the trademark "Epox No. 45" which is a mixture of epoxides containing 16 to 18 carbon atoms and containing one epoxy group per mole.

The product of the reaction between the silicon halide and the aliphatic epoxide is frequently a mixture, with the structure of the compounds forming the mixture being dependent upon the position of the epoxy group in the carbon chain and the compound length or lengths of the epoxide starting material. It is believed, however, that the reaction proceeds in accordance with a known manner as is described in U.S. Pat. No. 2,650,934 to form a beta-haloalkoxy group attached directly to the silicon atom:

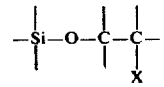

The reaction conditions employed in the preparation of the reaction product are not critical to the practice of this invention as it has been found that the reaction proceeds at room temperature. However, use can be made of a reaction temperature within the range of 10 to 100°C., depending somewhat on the boiling point of the silicon halide employed. The reaction can be carried out in the absence of any solvent, although inert organic solvents, such as normally liquid aliphatic hydrocarbon solvents, may be employed as desired. In general, use is made of 1 mole of the epoxide for every mole of halogen atom contained in the silicon halide. Where the silicon halide is a silicon tetrahalide, use can be made of a mole ratio of the silicon tetrahalide to epoxide within the range of 3.8 to 4.5, and preferably 3.95 to 4.05.

In the preferred practice of the present invention, the reaction product of the silicon halide and the aliphatic halide is formulated with a blend of a resorcinol-aldehyde resin and at least 1 elastomer. Such compositions are of themselves well known to those skilled in the art, and are described in U.S. Pat. Nos. 3,402,064, 3,424,608, 3,567,671, 3,597,357 as well as others. In formulating such compositions, the relative proportions of the reaction product and the resorcinol-aldehyde resin and the elastomer can be varied within relatively wide ranges. In general, it is preferred to formulate such compositions to include 2 to 10 parts by weight of the resorcinol-aldehyde resin, 20 to 60 parts by weight of the elastomer, and 0.01 to 5 parts by weight of the reaction product. The resulting composition can then be applied to glass fibers, preferably as they are formed, to provide a thin coating on the individual glass fiber filaments. The coated glass fibers can then be combined directly with elastomeric materials in the manufacture of glass fiber reinforced elastomeric products.

In accordance with another embodiment of the present invention, the reaction product of the silicon halide and the aliphatic epoxide can simply be formulated into an aqueous medium for application to glass fiber surfaces to form a thin film coating thereon. It is frequently preferred to formulate the reaction product of the present invention in combination with a film forming material as in the formulation of a conventional size composition. A wide variety of film forming materials well known to those skilled in the art can be used for this purpose, and includes polyester resins, polyamide resins, polyolefin resins, (eg., polyethylene, polypropylene, copolymers of ethylene and propylene, etc.), polyepoxide resins, vinyl resins (eg., polymers and copolymers of vinyl chloride, vinyl acetate, vinyl alcohol, vinyl pyrrolidone, etc.), waxes, partially dextrinized starch as well as numerous others. Such film forming materials are themselves well known to those skilled in the art, and are described in U.S. Pat. Nos. 2,931,739, 2,958,114, 3,040,413, 3,252,278 and 3,424,608. Combinations of two or more of these film forming materials can likewise be employed as desired.

The size compositions can also be formulated to include any of a variety of wetting agents, glass fiber lubricants, etc., which are likewise known to the art, such as those described in U.S. Pat. No. 3,676,287. The size compositions can be formulated in aqueous media or in inert organic solvents, depending on the intended use of the treated glass fibers and the nature of the film forming material or materials employed.

Having described the basic concepts of the present invention, reference is now made to the following examples which are provided by way of illustration and not by way of limitation in the practice of this invention in the preparation and use of betahaoloalkoxy organosilicon compounds prepared by reaction of a silicon halide and an aliphatic epoxide.

EXAMPLE 1

This example illustrates the preparation of an organosilicon compound in accordance with the practice of this invention.

Into a round bottom flask equipped with a mechanical stirrer, a thermometer, a reflex condenser, and an addition funnel, there is added 283 ml (2.50 moles) of $SiCl_4$ followed by the addition of 3,480 g of "Epox No. 45" from Proctor & Gamble (10.0 epoxide equivalent, 10 moles). The flask is then warmed to 90° C. for 15 hours. The product is found to have a neutral pH and to contain betachloroalkoxy groups.

EXAMPLE 2

Using the procedure described in Example 1, 1 mole of silicon tetrabromide is reacted with 4 moles of "Epox No. 45". The product is found to have a neutral pH and is found to contain betabromoalkoxy groups.

EXAMPLE 3

This example illustrates the use of the organosilicon reaction product in a composition formulated of a resorcinolformaldehyde resin and an elastomer.

A sample of 40 g of the reaction product obtained in Example 1 is admixed with 40 g of a protective colloid protein marketed by Swift & Company under the trademark TPC No. 1 and 20 g of diacetone alcohol, and the resulting mixture is added to an impregnant composition formulated as follows:

| | |
|---|---|
| 105 party by wt. | resorcinol-formaldehyde polymer in the form of a latex containing 75% solids (Penacolite R2170) |
| 805 parts by wt. | butadiene-styrene-vinyl pyridine terpolymer (42% solids) ILPF 4545) |
| 230 parts by wt. | Dicarboxylated butadiene-styrene copolymer (50% solids) (LPR 4303) |
| 100 parts by wt. | micro-crystalline paraffin wax (melting point 145-150°F.) - Vultex Wax Emulsion No. 5 of General Latex and Chemical Corp. (55% solids) |
| 115 parts by wt. | deionized water |
| 11.8 parts by wt. | formalin (37% formaldehyde) |

The foregoing composition is prepared in accordance with the procedure described in co-pending application Ser. No. 312,161 filed on Dec. 4, 1972, the disclosure of which is incorporated herein by reference.

The resulting composition containing the reaction product of Example 1 is then applied to glass fibers, preferably as they are formed, to form a thin coating on the glass fibers in accordance with conventional techniques. The resulting coated glass fibers can then be combined directly with elastomeric materials without the need to employ an impregnation step to form a glass fiber reinforced elastomeric product.

Additional examples of compositions formulated with the reaction product of Examples 1 and 2 are as follows:

EXAMPLE 4

Using the procedure described in U.S. Pat. No. 3,567,671, an impregnating composition is formulated in accordance with the following

Impregnating Composition

| | Parts by weight |
|---|---|
| Resorcinol-aldehyde resin | 2–10 |
| Vinyl pyridine-butadiene-styrene terpolymer | 20–60 |
| Vinyl chloride-vinylidene chloride copolymer | 15–40 |
| Microcrystalline paraffin wax | 5–30 |
| Silane of Example 2 | 0.1–10 |

It is found that the above composition, which is diluted with water to adjust the solids content to within the range of 20 to 55% by weight solids, is stable over long periods of time. No coagulation of the latex components is observed.

EXAMPLE 5

Impregnating Composition

| | Parts by weight |
|---|---|
| Resorcinol-formaldehyde resin | 2–10 |
| Vinyl pyridine-butadiene-styrene terpolymer | 20–60 |
| Dicarboxylated butadiene-styrene resin (Pliolite 4121) | 15–40 |
| Microcrystalline wax | 5–30 |
| Silane of Example 1 | 0.1–10 |

EXAMPLE 6

Impregnating Composition

| | Parts by weight |
|---|---|
| Resorcinol-formaldehyde resin | 2–10 |
| Vinyl pyridine-butadiene-styrene terpolymer | 20–60 |

-continued

| | Parts by weight |
|---|---|
| Silane of Example 2 | 0.1–10 |

EXAMPLE 7

Impregnating Composition

| | Parts by weight |
|---|---|
| Resorcinol-formaldehyde resin | 2–10 |
| Natural rubber latex or SBR latex | 20–60 |
| Silane of Example 2 | 0.1–10 |

EXAMPLE 8

Impregnating Composition

| | Parts by weight |
|---|---|
| Resorcinol-formaldehyde resin | 2–10 |
| Vinyl pyridine-butadiene-styrene terpolymer | 20–60 |
| Silane of Example 2 | 0.1–10 |

Each of the compositions of Examples 5 to 8, diluted with water to adjust the solids content, can be employed in the treatment of glass fibers which then can be formed into bundles and combined with elastomeric materials in the manufacture of glass fiber reinforced elastomeric products.

AS indicated above, the reaction product employed in the practice of the present invention can also be formulated into a size composition for use in the treatment of glassfibers for reinforcement of resinous plastics or elastomeric materials.

Examples of such size compositions which can be employed in the treatment of glass fibers for use in the manufacture of glass fiber reinforced resins and elastomeric products include the following.

EXAMPLE 9

Size Composition

| | Parts by weight |
|---|---|
| Product of Example 1 | 1.0 |
| Polypropylene emulsion | 5.5 |
| Water | 93.5 |

EXAMPLE 10

Size Composition

| | Parts by weight |
|---|---|
| Product of Example 2 | 1.1 |
| Wetting agent (Nopcogen 16L) | 0.1 |
| Water | 98.8 |

EXAMPLE 11

Size Composition

| | Parts by weight |
|---|---|
| Product of Example 2 | 1.5 |
| Epoxy resin (DER 330) | 7.0 |
| Diacetone alcohol | 91.5 |

EXAMPLE 12

Size Composition

| | Parts by weight |
|---|---|
| Product of Example 1 | 1.5 |
| Saturated polyester resin | 3.0 |
| Polyvinyl alcohol | 1.0 |
| Wetting agent | 0.5 |
| Water | 94.0 |

EXAMPLE 13

Size Composition

| | Parts by weight |
|---|---|
| Partially dextrinized starch | 8.0 |
| Hydrogenated vegetable oil | 1.5 |
| Wetting agent | 0.5 |
| Product of Example 2 | 1.8 |
| Water | 88.2 |

In formulating size compositions with the coupling agents of the present invention, the coupling agent is generally employed in an amount constituting from 0.1 to 10% by weight of the composition, and the film forming binder in an amount from 1 to 25% by weight of the composition. These amounts are not critical to the practice of the invention and can be varied as desired. The compositions of Examples 9 to 13 can be applied to glass fibers as they are formed or afterwards, in accordance with conventional procedures.

Glass fibers coated with the silanes of the present invention can be incorporated in the form of fibers, yarns, rovings, fabrics and the like with resin materials, including epoxy resins, polyester resin, polyamide resins as well as numerous other thermosetting plastics in amounts such that the treated glass fibers constitute from 1 to 20% by weight of the plastic laminate or coated fabric formed. The coating on the individual glass fibers, comprising as the essential component the silanes of the present invention, serves to provide a secure bonding relationship between the glass fiber surfaces and the resin.

Glass fiber sized with a composition of the type represented by Examples 9 to 13 can also be used in the manufacture of glass fiber reinforced elastomeric products. In accordance with this concept of the invention, glass fibers which have been sized with one of the compositions of Examples 9 to 13 are formed into strands, yarns, cords formed of strands which are plied and twisted together, or threads, generally referred to as bundles and subjected to impregnation with an aqueous composition formulated to include a resorcinolaldehyde resin component and an elastomer component.

Such impregnating compositions are now well known to those skilled in the art and are described in U.S. Pat. Nos. 3,402,064, 3,424,608, 3,567,671, 3,591,357, and numerous others. This concept may be illustrated by the following examples:

EXAMPLE 14

Using the procedure described in U.S. Pat. No. 3,567,671, an impregnating composition is formulated as follows:

Impregnating Composition

| | Parts by weight (solids basis) |
|---|---|
| Resorcinol-formaldehyde resin (Penacolyte R 2170) | 5.0 |
| Vinyl pyridine-butadiene-styrene terpolymer (Gentac PS) | 30.0 |
| Vinyl chloride-vinylidene chloride copolymer (Dow Latex 874) | 20.0 |
| Microcrystalline paraffin wax | 6.0 |

Water constitutes the balance of the composition and is present in an amount sufficient to adjust the solids content of the composition to within the range of 20 to 55% solids by weight. The impregnation can be carried out in accordance with the procedure described in U.S. Pat. No. 3,424,608 whereby the solids of the impregnating composition serve to coat the fibers which have been previously sized with one of the compositions of Examples 9 to 13 and serve to separate the sized fibers each from the other to cushion the fibers and protect the sized fibers from destruction by mutual abrasion.

EXAMPLE 15

Glass fibers sized with the composition of one of Examples 9 to 13 are impregnated with the following impregnating composition of the type illustrated in Example 14, except that the vinyl chloride-vinylidene chloride copolymer component is replaced by a dicarboxylated butadiene-styrene resin:

Impregnating Composition

| | Parts by weight (solids) |
|---|---|
| Resorcinol-formaldehyde resin | 5.0 |
| Vinyl pyridine-butadiene-styrene terpolymer | 30.0 |
| Dicarboxylated butadiene-styrene resin (Pliolite 4121 - Goodyear) | 20.0 |
| Microcrystalline paraffin wax | 6.0 |
| Water to solids content of 35% | |

Application of this impregnating composition can be made in an amount sufficient to deposit in the glass fiber bundle solids constituting from 15 to 40% by weight of the glass fiber system.

In facilitating the combination of glass fibers treated in accordance with the present invention with elastomeric materials, the individual glass fibers containing a coating on the surfaces thereof from Examples 3 to 8 or bundles of glass fibers sized with one of the compositions of Examples 9 to 13 and impregnated with one of the compositions of Examples 14 and 15 are mixed with elastomeric material or otherwise laid down in the desired arrangement for combination with the elastomeric material, as in the manufacture of glass fiber reinforced belts or in the manufacture of rubber tires reinforced with cords of glass fibers. The combination of glass fibers and elastomeric material is processed in a conventional manner by mold or cure under heat and compression or vuncanized for advancement of the elastomeric material to a cured or vulcanized stage while in combination with the treated glass fibers or bundles of glass fibers become strongly integrated with the elastomeric material in the glass fiber-elastomeric product.

In the final system, the elastomeric material with which the glass fibers or bundles of glass fibers are combined, constitutes a continuous phase. Such continuous phase elastomeric materials may comprise elastomers or rubbers of the type incorporated into the treating compositions or the elastomeric material can differ therefrom. It is believed that the tie-in between the individually coated glass fibers or the impregnated bundles of glass fibers and the elastomeric materials forming the continuous phase occurs primarily during cure or vulcanization of the elastomeric material in combination with the treated glass fibers.

It will be apparent that various changes and modifications can be made in the details of procedure, formulation and use without departing from the spirit of the invention, especially as defined in the following claims.

We claim:

1. Glass fibers having a thin coating on the surfaces thereof, said coating comprising the reaction product of (1) a silicon halide having the general formula $$(R)_n Si X_{4-n}$$

wherein R is an organic group containing ethylenic unsaturation, X is halogen and n is 0 or 1 with (2) an aliphatic epoxide containing 10 to 25 carbon atoms and about 1 epoxide group per mole, with the mole ratio of silicon halide to the epoxide being within the range of 3.8 to 4.5, said reaction product containing beta-haloalkoxy groups of the formula

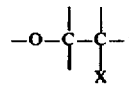

wherein X is halogen, said beta-haloalkoxy groups being attached directly to the silicon atom through the oxygen atom.

2. Glass fibers as defined in claim 1 wherein the halide is a silicon tetrahalide.

3. Glass fibers as defined in claim 1 wherein the composition is formulated to include at least one film forming material.

4. Glass fibers as defined in claim 3 wherein the film forming material is a blend of a resorcinol-aldehyde resin and at least one elastomer.

5. Glass fibers as defined in claim 1 wherein the epoxide is a mixture of aliphatic epoxides containing 16 to 18 carbon atoms.

6. Glass fibers having a thin coating on the surfaces thereof, said coating comprising a blend of a resorcinol-aldehyde resin, at least one elastomer and the reaction product of (1) a silicon tetrahalide and (2) an aliphatic epoxide containing 10 to 25 carbon atoms and about 1 epoxide group per mole, with the mole ratio of silicon tetrahalide to the epoxide being within the range of 3.8 to 4.5, said reaction product containing beta-haloalkoxy groups of the formula

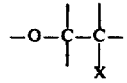

wherein X is halogen, said beta-haloalkoxy groups being attached directly to the silicon atom through the oxygen atom.

7. Glass fibers as defined in claim 6 wherein the coating includes 2 to 10 parts by weight of a resorcinolaldehyde resin, 20 to 60 parts by weight of a vinyl pyridine-butadiene-styrene terpolymer, 15 to 40 parts by weight of a material selected from the group consisting of a vinyl chloride-vinylidene chloride copolymer and a carboxylated butadiene-styrene copolymer and 5 to 30 parts by weight of a paraffin wax.

8. Glass fibers as defined in claim 7 wherein the material is a dicarboxylated butadiene-styrene copolymer.

9. A glass fiber bundle comprising a plurality of glass fibers, each of the glass fibers having a coating on the individual surfaces thereof, said coating comprising the reaction product of (1) a silicon halide having the general formula

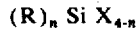
$$(R)_n Si X_{4-n}$$

wherein R is an organic group containing ethylenic unsaturation, X is halogen and n is 0 or 1 with (2) an aliphatic epoxide containing 10 to 25 carbon atoms and about 1 epoxide group per mole, with the mole ratio of silicon halide to the epoxide being within the range of 3.8 to 4.5, said reaction product containing beta-haloalkoxy group of the formula

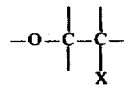

wherein X is halogen, said beta-haloalkoxy groups being attached directly to the silicon atom through the oxygen atom and an impregnant in the bundle, said impregnant comprising a blend of resorcinol-aldehyde and at least one elastomer.

10. A bundle as defined in claim 9 wherein said coating also includes a film forming material.

11. A bundle as defined in claim 9 wherein the impregnant includes 2 to 10 parts by weight of a resorcinol-aldehyde resin, 20 to 60 parts by weight of a vinyl pyridine-butadiene-styrene terpolymer, 15 to 40 parts by weight of a material selected from the group consisting of a vinyl chloride-vinylidene chloride copolymer and a carboxylated butadiene-styrene copolymer and 5 to 30 parts by weight of a paraffin wax.

12. A bundle as defined in claim 9 wherein the halide is a silicon tetrahalide.

13. A bundle as defined in claim 9 wherein the epoxide is a mixture of aliphatic epoxides containing 16 to 18 carbon atoms.

14. In a glass fiber reinforced plastic in which a thermoplastic and/or thermosetting resin constitutes a continuous phase in which the glass fibers are distributed, the improvement in the bonding relationship between the glass fibers and the resin comprising a coating on the glass fiber surfaces comprising the reaction product of (1) a silicon halide having the general formula

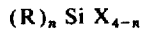
$$(R)_n Si X_{4-n}$$

wherein R is an organic group containing ethylenic unsaturation, X is halogen and n is 0 or 1 with (2) an aliphatic epoxide containing 10 to 25 carbon atoms and about 1 epoxide group per mole, with the mole ratio of silicon halide to the epoxide being within the range of 3.8 to 4.5, said reaction product containing beta-haloalkoxy groups of the formula

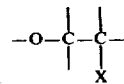

wherein X is halogen, said beta-haloalkoxy groups being attached directly to the silicon atom through the oxygen atom.

15. A plastic as defined in claim 14 wherein the halide is a silicon tetrahalide.

16. A plastic as defined in claim 14 wherein said coating also includes a film forming material.

* * * * *